US010995803B2

(12) United States Patent
Moore et al.

(10) Patent No.: US 10,995,803 B2
(45) Date of Patent: May 4, 2021

(54) ELECTROMAGNETIC SYSTEM FOR CONTROLLING THE OPERATING MODE OF A NON FRICTION COUPLING ASSEMBLY AND COUPLING AND MAGNETIC CONTROL ASSEMBLY HAVING SAME

(71) Applicant: Means Industries, Inc., Saginaw, MI (US)

(72) Inventors: Riley C. Moore, Flint, MI (US); Brice A. Pawley, Midland, MI (US); Joshua D. Hand, Midland, MI (US); Ryan W. Essenmacher, Saginaw, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 16/701,936

(22) Filed: Dec. 3, 2019

(65) Prior Publication Data

US 2020/0173499 A1    Jun. 4, 2020

Related U.S. Application Data

(60) Provisional application No. 62/774,957, filed on Dec. 4, 2018.

(51) Int. Cl.
*F16D 27/102*    (2006.01)
*F16D 27/00*    (2006.01)

(52) U.S. Cl.
CPC ......... *F16D 27/004* (2013.01); *F16D 27/102* (2013.01); *F16D 2027/005* (2013.01); *F16D 2027/008* (2013.01)

(58) Field of Classification Search
CPC ..................... F16D 27/00–14; F16D 41/12–16
See application file for complete search history.

(56) References Cited

U.S. PATENT DOCUMENTS 4,050,560 A    9/1977 Torstenfelt
4,340,133 A    7/1982 Blersch
(Continued)

FOREIGN PATENT DOCUMENTS

CN    107747600 A   *  3/2018

OTHER PUBLICATIONS

International Searching Authority, International Search Report and the Written Opinion for International Application No. PCT/US2019/064363 dated Feb. 4, 2020.

*Primary Examiner* — Ernesto A Suarez
*Assistant Examiner* — Lillian T Nguyen
(74) *Attorney, Agent, or Firm* — Brooks Kushman P.C.

(57) ABSTRACT

An electromagnetic system for controlling the operating mode of a non-friction coupling assembly and a coupling and magnetic control assembly are provided. Magnetic circuit components include a ferromagnetic or magnetic element received within a pocket of a coupling member. The element controls the operating mode of the coupling assembly. A stationary electromagnetic source includes at least one excitation coil which generates a magnetic field between poles of the source when the at least one coil is supplied with current. Ferromagnetic or magnetic first and second inserts are received and retained within first and second spaced passages, respectively, of the coupling member. The electromagnetic source, the element, the inserts and air gaps between the various magnetic circuit components make up a closed loop path containing magnetic flux so that the element moves between first and second positions of the element when the at least one coil is supplied with current.

24 Claims, 10 Drawing Sheets

(56) References Cited

U.S. PATENT DOCUMENTS

| | | |
|---|---|---|
| 5,052,534 A | 10/1991 | Gustin et al. |
| 5,070,978 A | 12/1991 | Pires |
| 5,206,573 A | 4/1993 | McCleer et al. |
| 5,231,265 A | 7/1993 | Hackett et al. |
| 5,362,293 A | 11/1994 | Romanauskas |
| 5,387,854 A | 2/1995 | McCleer et al. |
| 5,394,321 A | 2/1995 | McCleer et al. |
| 5,453,598 A | 9/1995 | Hackett et al. |
| 5,597,057 A | 1/1997 | Ruth et al. |
| 5,638,929 A | 6/1997 | Park |
| 5,642,009 A | 6/1997 | McCleer et al. |
| 5,678,668 A | 10/1997 | Sink |
| 5,918,715 A | 7/1999 | Ruth et al. |
| 5,924,510 A | 7/1999 | Itoh et al. |
| 5,927,455 A | 7/1999 | Baker et al. |
| 5,996,758 A | 12/1999 | Baxter, Jr. |
| 6,075,302 A | 6/2000 | McCleer |
| 6,193,038 B1 | 2/2001 | Scott et al. |
| 6,244,965 B1 | 6/2001 | Klecker et al. |
| 6,290,044 B1 | 9/2001 | Burgman et al. |
| 6,503,167 B1 | 1/2003 | Sturm |
| 6,605,576 B2 | 8/2003 | Lee |
| 6,814,201 B2 | 11/2004 | Thomas |
| 6,846,257 B2 | 1/2005 | Baker et al. |
| 6,953,409 B2 | 10/2005 | Schmidt et al. |
| 6,982,502 B1 | 1/2006 | Sendaula et al. |
| 7,093,512 B2 | 8/2006 | Ibamoto et al. |
| 7,153,228 B2 | 12/2006 | Fujiu et al. |
| 7,198,587 B2 | 4/2007 | Samie et al. |
| 7,223,198 B2 | 5/2007 | Kimes et al. |
| 7,256,510 B2 | 8/2007 | Holmes et al. |
| 7,258,214 B2 | 8/2007 | Pawley et al. |
| 7,275,628 B2 | 10/2007 | Pawley et al. |
| 7,344,010 B2 | 3/2008 | Fetting, Jr. et al. |
| 7,349,010 B2 | 3/2008 | Bryant et al. |
| 7,366,298 B2 | 4/2008 | Pedersen et al. |
| 7,464,801 B2 | 12/2008 | Wittkopp |
| 7,484,605 B2 | 2/2009 | Pawley et al. |
| 7,491,151 B2 | 2/2009 | Maguire et al. |
| 7,690,455 B2 | 4/2010 | Kano et al. |
| 7,806,795 B2 | 10/2010 | Oba et al. |
| 7,915,300 B2 | 3/2011 | Nilsson et al. |
| 7,942,781 B2 | 5/2011 | Kimes |
| 8,418,825 B2 | 4/2013 | Bird |
| 8,978,878 B2 | 3/2015 | De Martin |
| 9,097,299 B2 | 8/2015 | Sharp |
| 9,127,730 B2 | 9/2015 | Greene et al. |
| 9,732,809 B2 | 8/2017 | Niemiec et al. |
| 9,739,322 B2 | 8/2017 | Greene et al. |
| 10,024,370 B1 | 7/2018 | Klaser et al. |
| 2004/0110594 A1 | 6/2004 | Goto |
| 2006/0138777 A1 | 6/2006 | Hofbauer et al. |
| 2006/0185957 A1 | 8/2006 | Kimes et al. |
| 2007/0056825 A1 | 3/2007 | Fetting, Jr. et al. |
| 2007/0278061 A1 | 12/2007 | Wittkopp et al. |
| 2008/0110715 A1 | 5/2008 | Pawley |
| 2008/0169165 A1 | 7/2008 | Samie et al. |
| 2008/0169166 A1 | 7/2008 | Wittkopp et al. |
| 2008/0185253 A1 | 8/2008 | Kimes |
| 2008/0223681 A1 | 9/2008 | Stevenson et al. |
| 2009/0084653 A1 | 4/2009 | Holmes |
| 2009/0098968 A1 | 4/2009 | Maguire et al. |
| 2009/0098970 A1 | 4/2009 | Kimes |
| 2009/0127059 A1 | 5/2009 | Knoblauch |
| 2009/0133981 A1 | 5/2009 | Tarasinski et al. |
| 2009/0142207 A1 | 6/2009 | Ring et al. |
| 2009/0159391 A1 | 6/2009 | Eisengruber |
| 2009/0194381 A1 | 8/2009 | Samie |
| 2009/0211863 A1 | 8/2009 | Kimes |
| 2009/0255773 A1 | 10/2009 | Seufert et al. |
| 2010/0044141 A1 | 2/2010 | Kimes et al. |
| 2010/0071497 A1 | 3/2010 | Reisch et al. |
| 2010/0119389 A1 | 5/2010 | Lazebnik et al. |
| 2010/0200358 A1 | 8/2010 | Eisengruber et al. |
| 2010/0230226 A1 | 9/2010 | Prout |
| 2010/0252384 A1 | 10/2010 | Eisengruber |
| 2011/0140451 A1 | 6/2011 | Sharpies et al. |
| 2011/0177900 A1 | 7/2011 | Simon |
| 2011/0215575 A1 | 9/2011 | Hofbauer et al. |
| 2011/0233026 A1 | 9/2011 | Pawley |
| 2012/0145505 A1* | 6/2012 | Kimes ............... F16D 27/10 192/45.1 |
| 2013/0015033 A1 | 1/2013 | Pardee et al. |
| 2014/0284167 A1* | 9/2014 | Kimes ............... F16D 27/09 192/84.92 |
| 2014/0291100 A1 | 10/2014 | Sharp |
| 2015/0014116 A1 | 1/2015 | Kimes et al. |
| 2016/0160941 A1 | 6/2016 | Green et al. |
| 2016/0252142 A1 | 9/2016 | Greene |
| 2017/0138414 A1 | 5/2017 | Cioc et al. |
| 2017/0248174 A1 | 8/2017 | Greene et al. |
| 2018/0094677 A1 | 4/2018 | Cioc et al. |
| 2018/0202502 A1 | 7/2018 | Klaser et al. |
| 2019/0031012 A1* | 1/2019 | Bird ............... B60K 6/383 |

\* cited by examiner

ELECTROMAGNETIC SYSTEM FOR CONTROLLING THE OPERATING MODE OF A NON FRICTION COUPLING ASSEMBLY AND COUPLING AND MAGNETIC CONTROL ASSEMBLY HAVING SAME

CROSS-REFERENCE TO RELATED APPLICATIONS

This application claims the benefit of U.S. provisional application Ser. No. 62/774,957, filed Dec. 4, 2018, the disclosure of which is hereby incorporated in its entirety by reference herein.

TECHNICAL FIELD

This invention generally relates to systems for controlling the operating mode of a non-friction coupling assembly and coupling and control assemblies having same and, in particular, to such systems which are electromagnetically operated and magnetically controlled.

OVERVIEW

A typical one-way clutch (OWC) consists of an inner ring, an outer ring and a locking device between the two rings. The one-way clutch is designed to lock in one direction and to allow free rotation in the other direction. Two types of one-way clutches often used in vehicular, automatic transmissions include:

Roller type which consists of spring loaded rollers between the inner and outer races of the one-way clutch. (Roller type is also used without springs on some applications); and Sprag type which consists of asymmetrically shaped wedges located between the inner and outer races of the one-way clutch.

The one-way clutches are typically used in the transmission to prevent an interruption of drive torque (i.e., power flow) during certain gear shifts and to allow engine braking during coasting.

Controllable or selectable one-way clutches (i.e., OWCs) are a departure from traditional one-way clutch designs. Selectable OWCs add a second set of locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or control mechanism. Movement of this selection mechanism can be between two or more positions which correspond to different operating modes.

U.S. Pat. No. 5,927,455 discloses a bi-directional overrunning pawl-type clutch, U.S. Pat. No. 6,244,965 discloses a planar overrunning coupling, and U.S. Pat. No. 6,290,044 discloses a selectable one-way clutch assembly for use in an automatic transmission.

U.S. Pat. Nos. 7,258,214 and 7,344,010 disclose overrunning coupling assemblies, and U.S. Pat. No. 7,484,605 discloses an overrunning radial coupling assembly or clutch.

A properly designed controllable OWC can have near-zero parasitic losses in the "off" state. It can also be activated by electro-mechanics and does not have either the complexity or parasitic losses of a hydraulic pump and valves.

Other related U.S. patent publications include; 2011/0140451; 2011/0215575; 2011/0233026; 2011/0177900; 2010/0044141; 2010/0071497; 2010/0119389; 2010/0252384; 2009/0133981; 2009/0127059; 2009/0084653; 2009/0194381; 2009/0142207; 2009/0255773; 2009/0098968; 2010/0230226; 2010/0200358; 2009/0211863; 2009/0159391; 2009/0098970; 2008/0223681; 2008/0110715; 2008/0169166; 2008/0169165; 2008/0185253; 2007/0278061; 2007/0056825; 2006/138777; 2006/0185957; 2004/0110594; and the following U.S. Pat. Nos. 7,942,781; 7,806,795; 7,690,455; 7,491,151; 7,484,605; 7,464,801; 7,275,628; 7,256,510; 7,223,198; 7,198,587, 7,093,512; 6,953,409; 6,846,257; 6,814,201; 6,503,167; 6,193,038; 4,050,560; 4,340,133; 5,597,057; 5,918,715; 5,638,929; 5,362,293; 5,678,668; 5,070,978; 5,052,534; 5,387,854; 5,231,265; 5,394,321; 5,206,573; 5,453,598; 5,642,009; 6,075,302; 6,982,502; 7,153,228; 5,924,510; and 5,918,715.

Mechanical forces that are due to local or distant magnetic sources, i.e. electric currents and/or permanent magnet (PM) materials, can be determined by examination of the magnetic fields produced or "excited" by the magnetic sources. A magnetic field is a vector field indicating at any point in space the magnitude and direction of the influential capability of the local or remote magnetic sources. The strength or magnitude of the magnetic field at a point within any region of interest is dependent on the strength, the amount and the relative location of the exciting magnetic sources and the magnetic properties of the various mediums between the locations of the exciting sources and the given region of interest. By magnetic properties one means material characteristics that determine "how easy" it is to, or "how low" a level of excitation is required to, "magnetize" a unit volume of the material, that is, to establish a certain level of magnetic field strength. In general, regions which contain iron material are much easier to "magnetize" in comparison to regions which contain air or plastic material.

Magnetic fields can be represented or described as three-dimensional lines of force, which are closed curves that traverse throughout regions of space and within material structures. When magnetic "action" (production of measurable levels of mechanical force) takes place within a magnetic structure these lines of force are seen to couple or link the magnetic sources within the structure. Lines of magnetic force are coupled/linked to a current source if they encircle all or a portion of the current path in the structure. Force lines are coupled/linked to a PM source if they traverse the PM material, generally in the direction or the anti-direction of the permanent magnetization. Individual lines of force or field lines, which do not cross one another, exhibit levels of tensile stress at every point along the line extent, much like the tensile force in a stretched "rubber band," stretched into the shape of the closed field line curve. This is the primary method of force production across air gaps in a magnetic machine structure.

One can generally determine the direction of net force production in portions of a magnetic machine by examining plots of magnetic field lines within the structure. The more field lines (i.e. the more stretched rubber bands) in any one direction across an air gap separating machine elements, the more "pulling" force between machine elements in that given direction.

Metal injection molding (MIM) is a metalworking process where finely-powdered metal is mixed with a measured amount of binder material to comprise a 'feedstock' capable of being handled by plastic processing equipment through a process known as injection mold forming. The molding process allows complex parts to be shaped in a single operation and in high volume. End products are commonly component items used in various industries and applications. The nature of MIM feedstock flow is defined by a physics called rheology. Current equipment capability requires processing to stay limited to products that can be molded using typical volumes of 100 grams or less per "shot" into the mold. Rheology does allow this "shot" to be distributed into multiple cavities, thus becoming cost-effective for small, intricate, high-volume products which would otherwise be quite expensive to produce by alternate or classic methods. The variety of metals capable of implementation within MIM feedstock are referred to as powder metallurgy, and these contain the same alloying constituents found in industry standards for common and exotic metal applications. Subsequent conditioning operations are performed on the molded shape, where the binder material is removed and the metal particles are coalesced into the desired state for the metal alloy.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling," "clutch" and "brake" may be used interchangeably.

A number of magnetically and electromagnetically actuated clutches are disclosed by the prior art such as the following U.S. Patent documents: 2018/0202502; U.S. Pat. Nos. 5,996,758; 9,732,809; 8,418,825; 9,097,299; 10,024,370; 9,127,730; 9,366,298; 9,739,322; 9,915,301; 2017/0248174; 2017/0138414; 2018/0094677; 2016/0160941; 2016/0252142; and 2019/0323568.

Many of such systems seek to reduce frictional losses that are present in actuation systems that act on locking elements within a rotating clutch member.

A magnetic circuit is made up of one or more closed loop paths containing a magnetic flux. The flux is usually generated by permanent magnets or electromagnets and confined to the path by magnetic cores consisting of ferromagnetic materials like iron, although there may be air gaps or other material in the path.

Similar to the way that electromotive force (EMF) drives a current of electrical charge in electrical circuits, magnetomotive force (MMF) 'drives' magnetic flux through magnetic circuits.

The unit of magnetomotive force is the ampere-turn (At) represented by a steady, direct electric current of one ampere flowing in a single-turn loop of electrically conducting material in a vacuum.

Magnetic flux always forms a closed loop, but the path of the loop depends on the reluctance of the surrounding materials. It is concentrated around the path of least reluctance. Air and vacuum have high reluctance, while easily magnetized materials such as soft iron have low reluctance. The concentration of flux in low-reluctance materials forms strong temporary poles and causes mechanical forces that tend to move the materials towards regions of higher flux so it is always an attractive force (pull). If a permanent magnet is used as a magnetic circuit component in the loop, a repulsive force (i.e. push) can be generated.

As described in U.S. Patent document 2013/0015033, a magnetic circuit used to engage a coupling device may be weakened by leakage of magnetic flux along various paths. The presence of this flux pathway (or leakage circuit) drains magnetic flux from an interface thereby reducing the flux density at the interface and the attractive force. Such attractive forces need to be maximized in many situations.

SUMMARY OF EXAMPLE EMBODIMENTS

An object of at least one embodiment of the present invention is to provide an electromagnetic system for controlling the operating mode of a non-friction coupling assembly and coupling and magnetic control assembly having same wherein the magnetic attractive force on a ferromagnetic or magnetic locking element is maximized by increasing the flux density at the interface between the locking element and an electromagnetic source and decreasing any flux leakage.

In carrying out the above object and other objects at least one embodiment of the present invention, an electromagnetic system for controlling the operating mode of a non-friction coupling assembly is provided. The assembly includes first and second coupling members supported for a rotation relative to one another about a common axis. The first and second coupling members include coupling first and second faces, respectively, in close-spaced opposition with one another. The second coupling member has a third face spaced from the second face. The second face has a pocket. The first face has a set of locking formations and the third face has first and second spaced passages in communication with the pocket. The system includes magnetic circuit components including a ferromagnetic or magnetic element received within the pocket in a first position and projecting outwardly from the pocket to a second position. The element controls the operating mode of the coupling assembly. A stationary electromagnetic source includes at least one excitation coil which generates a magnetic field between poles of the source when the at least one coil is supplied with current. Ferromagnetic or magnetic first and second inserts are received and retained within the first and second spaced passages, respectively, of the second coupling member. The first and second inserts are in closed-spaced opposition across first and second air gaps, respectively, with the first and second poles, respectively, of the electromagnetic source. The first and second inserts are in close spaced opposition across third and fourth air gaps, respectively, with first and second spaced positions, respectively, of the element. The electromagnetic source, the inserts, the air gaps and the element make up a closed loop path containing magnetic flux so that the element moves between the first and second spaced positions when the at least one coil is supplied with current.

The first and third faces may be oriented to face axially in a first direction along the rotational axis and the second face may be oriented to face axially in a second direction opposite the first direction along the rotational axis.

The electromagnetic source may further include an annular ring housing having an annular recess in which the at least one coil is located. The housing may be axially symmetric about the rotational axis. The magnetic field may be a generally circular magnetic field.

The housing may have a generally C-shaped cross-section.

The element may be a locking element which prevents relative rotation of the first and second coupling members with respect to each other in at least one direction about the rotational axis.

The locking element may be an injection molded strut.

The system may further include a return biasing member to urge the element to a return position which corresponds to either the first position or the second position of the element.

The first, second and third faces may be generally annular and extend generally radially with respect to the axis.

The coupling assembly may be a clutch assembly and the first and second faces may be clutch faces.

The at least one coil may have a circumference wherein the inserts may comprise magnetic pole pieces which cover substantially the entire circumference of the at least one coil.

The second coupling member may be made of non-ferrous/non-magnetic material.

A plurality of coils may generate the magnetic field.

Further in carrying out the above object and other objects of at least one embodiment of the present invention, a coupling and magnetic control assembly is provided. First and second coupling members are supported for a rotation relative to one another about a common axis. The first and second coupling members include coupling first and second faces, respectively, in close-spaced opposition with one another. The second coupling member has a third face spaced from the second face. The second face has a pocket. The first face has a set of locking formations and the third face has first and second spaced passages in communication with the pocket. The assembly includes magnetic circuit components including a ferromagnetic or magnetic element received within the pocket in a first position and projecting outwardly from the pocket in a second position. The element controls the operating mode of the coupling assembly. A stationary electromagnetic source includes at least one excitation coil which generates a magnetic field between poles of the source when the at least one coil is supplied with current. Ferromagnetic or magnetic first and second inserts are received and retained within the first and second spaced passages, respectively, of the second coupling member. The first and second inserts are in close-spaced opposition across first and second air gaps, respectively, with the first and second poles, respectively, of the electromagnetic source. The first and second inserts are in close-spaced opposition across third and fourth air gaps, respectively, with first and second spaced portions, respectively, of the element. The electromagnetic source, the inserts, the air gaps and the element make up a closed loop path containing magnetic flux so that the element moves between the first and second positions when the at least one coil is supplied with current.

The first and third faces may be oriented to face axially in a first direction along the rotational axis and the second face may be oriented to face axially in a second direction opposite the first direction along the rotational axis.

The electromagnetic source may further include an annular ring housing having an annular recess in which the coil is located. The housing may be axially symmetric about the rotational axis. The magnetic field may be a generally circular magnetic field.

The housing may have a generally C-shaped cross-section.

The element may be a locking element which prevents relative rotation of the first and second coupling members with respect to each other in at least one direction about the rotational axis.

The locking element may be an injection molded strut.

The assembly may further include a return biasing member to urge the element to a return position which corresponds to either the first position or the second position of the element.

The first, second and third faces may be generally annular and extend generally radially with respect to the axis.

The coupling assembly may be a clutch assembly and the first and second faces may be clutch faces.

The at least one coil may have a circumference wherein the inserts may comprise magnetic pole pieces which cover substantially the entire circumference of the at least one coil.

The second coupling member may be made of non-ferrous/non-magnetic material.

A plurality of coils may generate the magnetic field.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIGS. 1-5, there is illustrated a planar, coupling and magnetic control assembly, generally indicated at 11. The assembly 11 includes a first coupling member, generally indicated at 10, which may comprise a notch plate or member having a first coupling face 12.

Figure 5:
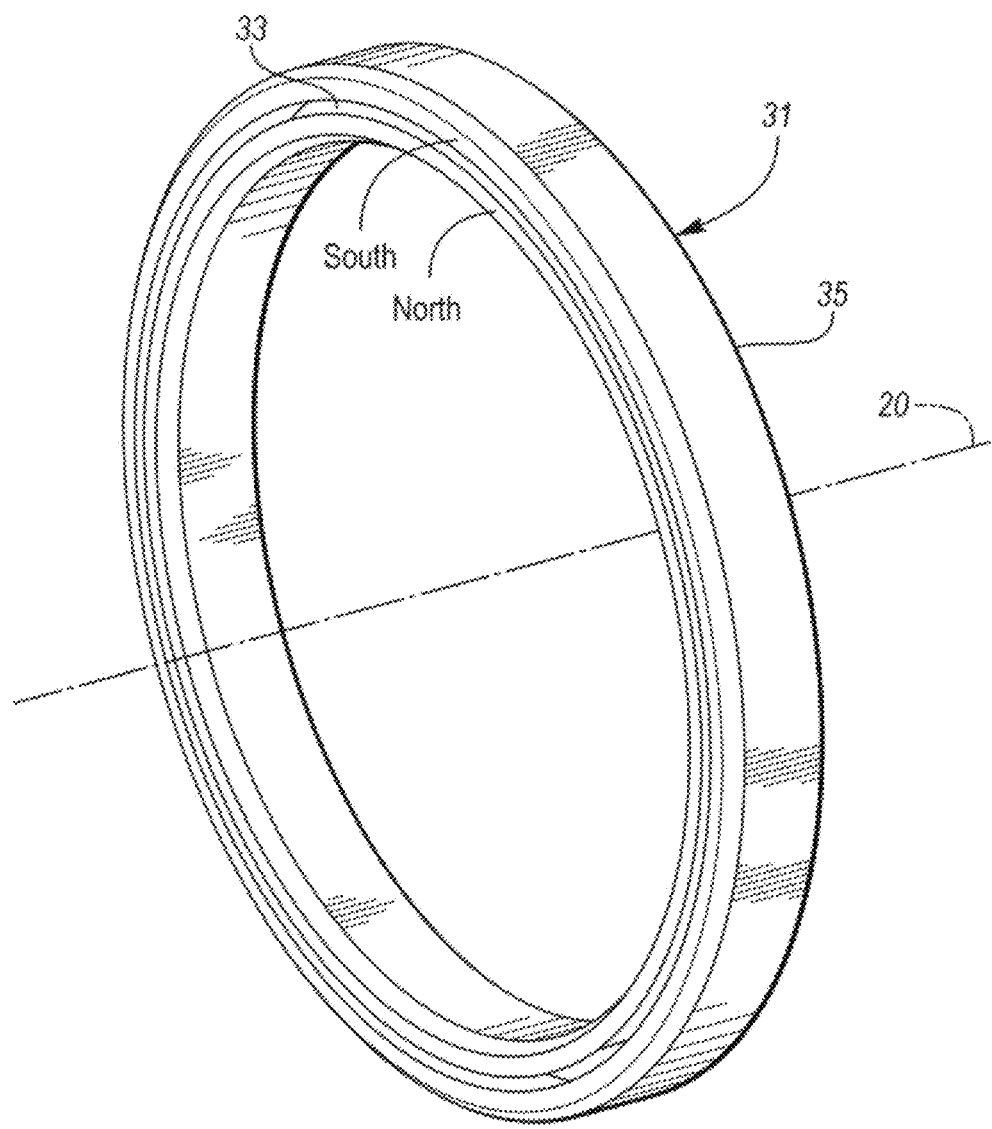
FIG. 5 is a side perspective schematic view of the electromagnetic source which is capable of generating the circular magnetic fields of FIG. 4 when a coil contained in an annular recess of the annular housing of the source is energized by current.
Figure 6:
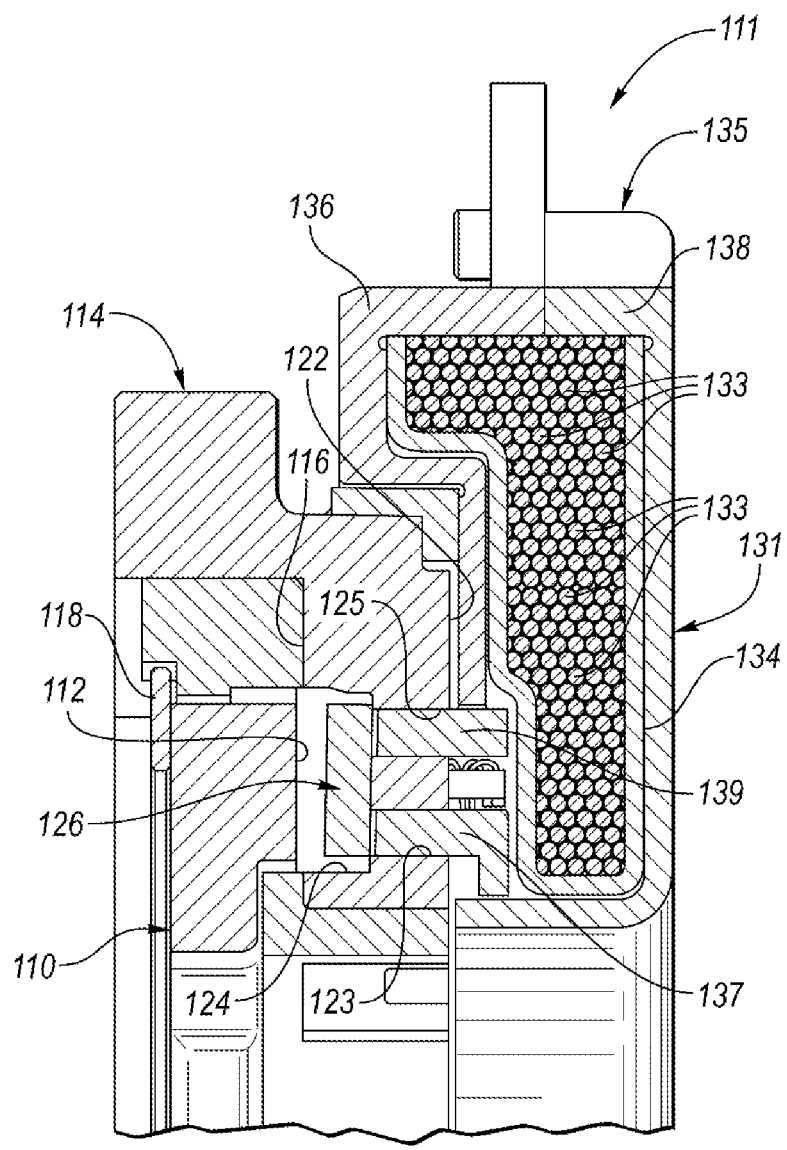
FIG. 6 is a view, partially broken away and in cross section, of the coupling and magnetic control assembly constructed in accordance with a second embodiment of the present invention.
Figure 7:
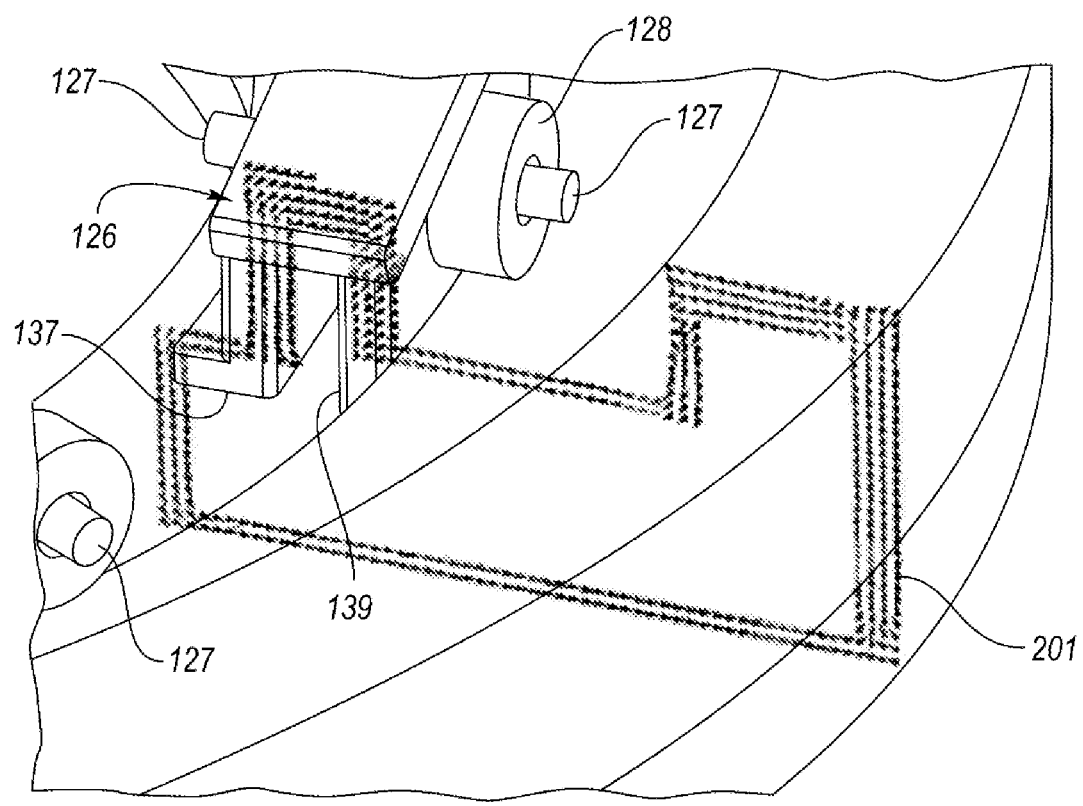
FIG. 7 is an enlarged view of a portion of the assembly of FIG. 6 showing a scale and magnetic field lines due to coil currents in an electromagnetic source of the assembly.

The assembly 11 may include a non-ferrous, non-magnetic pocket plate or second member, generally indicated at 14, which includes a second coupling face 16 in close-spaced opposition with the first coupling face 12, when the members 10 and 14 are assembled and held together by a locking or snap ring 18. At least one of the members 10 and 14 is mounted for rotation about a common axis 20 (FIG. 5).

The second coupling member 14 also includes third face 22 spaced from the second face 16. The third face 22 has first and second spaced passages 25 and 23 which extend through the second coupling member 14 in communication with a pocket 24 formed in the second face 16.

Figure 3:
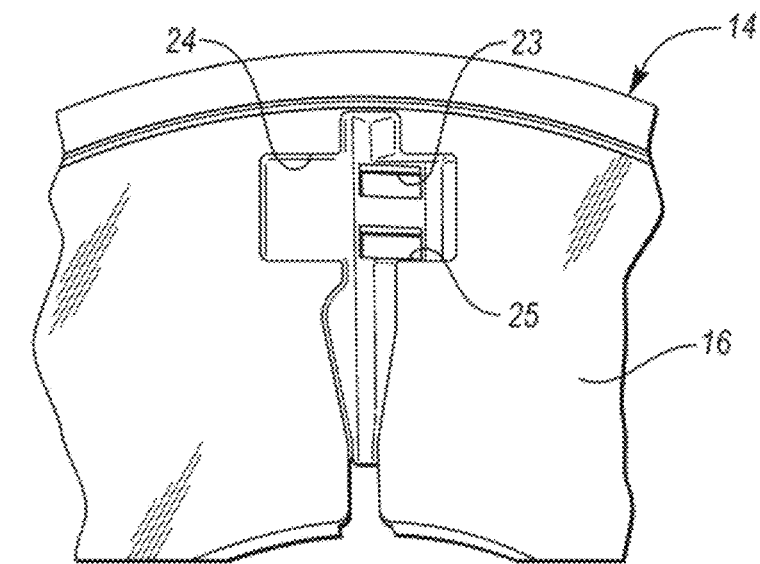
FIG. 3 is a top plan view, partially broken away, of the second coupling member or pocket plate to show where the magnetic pole pieces are to be fit or inserted within the plate.

The pocket 24 preferably is a T-shaped recess or pocket 24 as best shown in FIG. 3. The recess 24 defines a load bearing first shoulder. The first coupling face 12 of the notch plate 10 has a plurality of recesses or notches (not shown in the first embodiment, but shown in the second embodiment of the notch plate 110 in FIG. 10). Each notch of the notches defines a load-bearing second shoulder. While only a single pocket 24 is shown, it is to be understood that a plurality of pockets 24 (and struts 26) are preferred.

An electromagnetic system for controlling the operating mode of the coupling assembly includes a plurality of magnetic circuit components including a ferro-magnetic element or a locking strut, generally included at 26, extendable between the coupling faces 12 and 16 of the member 10 and the member 14, respectively, when the members 10 and 14 are assembled and held together.

The element 26 may comprise a ferromagnetic locking element or strut movable between first and second positions. The first position (not shown) is characterized by abutting engagement of the locking element 26 with a load-bearing shoulder (not shown) of the member 10 and the shoulder of the pocket 24 formed in an end wall of the second member 14. The second position (solid lines in FIGS. 1 and 2) is characterized by non-abutting engagement of the locking element 26 with a load-bearing shoulder of at least one of the members 10 and 14. A return biasing member or spring (not shown in the first embodiment, but shown in the second embodiment at 129) may be positioned under each of the struts 26 to urge its strut 26 to a return position which corresponds to the uncoupling position of the strut 26.

The electromagnetic system also includes a stationary electromagnetic source, generally indicated at 31, including at least one excitation coil 33 which is at least partially surrounded by a generally C-shaped (in cross-section) annular ring housing part 35. Instead of a single coil a plurality of similar coils could be provided to feed MMF into the core plates. In this embodiment, the coils would each wrap around a section of the core with the axes of the coils pointing in the direction of the field through the core. When the at least one coil 33 is energized (supplied with current), an axial symmetric, generally circular magnetic field (indicated by phantom lines in FIG. 1) loops out of the housing part 35 at a north pole of the housing part 35, through a magnetic insert or pole piece 37, into a first portion of the strut 26, out a second portion of the strut, through another insert or pole piece 39 and back into the housing part 35 at a south pole of the housing part 35.

The pole pieces 37 and 39 are inserted into the bottom of the pocket 24 through the third face 22 and are received and retained within the first and second passages 25 and 23, respectively, and are in close-spaced opposition with the north and south poles, respectively, of the housing part 35.

The electromagnetic source 31, the element 26, the inserts 37 and 39, the air gaps between the inserts 37 and 39 and the element 26 and the air gaps between the source 31 and the inserts 37 and 39 make up a closed loop path containing magnetic flux so that the element 26 moves between its coupling and uncoupling positions when the coil 33 is supplied with current. The pole pieces 37 and 39 direct the magnetic field into the strut 26 to attract (or repel) the strut 26 and move the strut 26 into an engaged (or disengaged) position.

Figure 4:
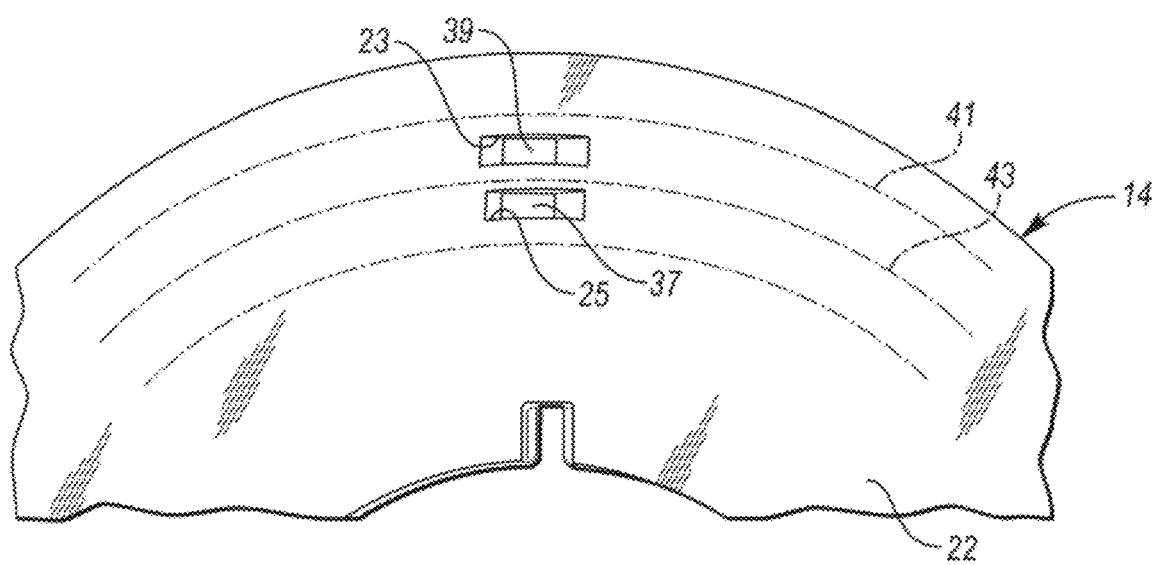
FIG. 4 is a bottom view, partially broken away, of the pocket plate and further illustrating where the circular magnetic field generated by the electromagnetic source points up and down with respect to the pole pieces.

Referring now to FIG. 4, there is illustrated by phantom lines 41 an outwardly pointing (out of the page), circular magnetic field at the third face 22 in which the insert 39 is located. Phantom lines 43 illustrate an inwardly pointing (into the page), circular magnetic field in which insert 37 is located at the third face 22 of the second coupling member 14. The source 31 of FIG. 5 directs a magnetic field at the back of the pocket plate 14 when the coil 33 is energized. The resulting magnetic field permeates into the pole pieces 37 and 39 and the strut 26.

Figure 1:
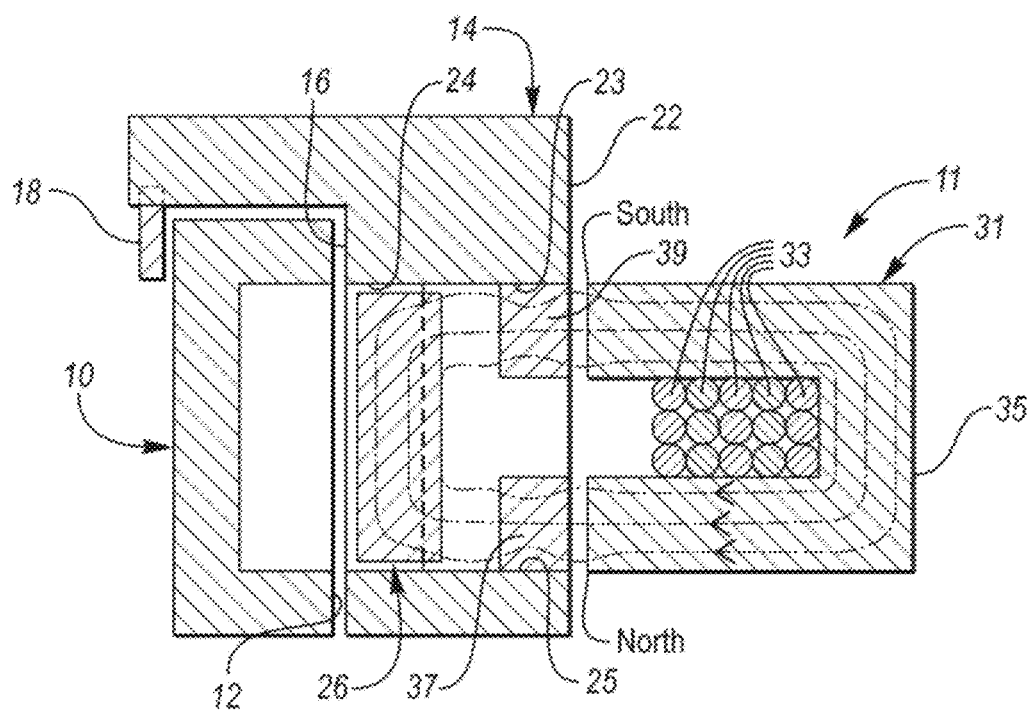
FIG. 1 is a side sectional schematic view of a coupling and magnetic control assembly constructed in accordance with at least one embodiment of the present invention and showing magnetic flux lines when a coil of a stationary electromagnetic source is supplied with current.
Figure 2:
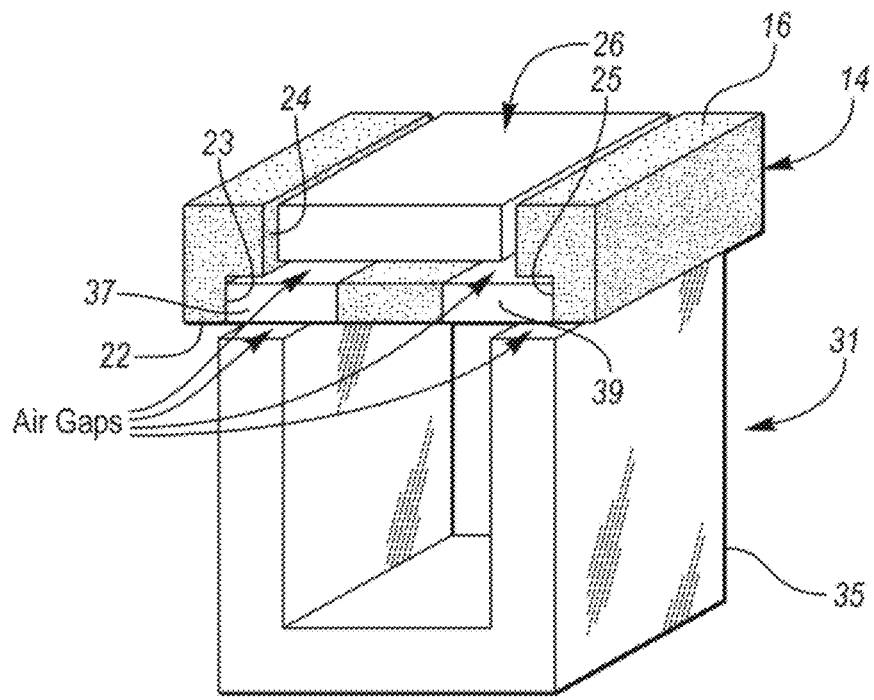
FIG. 2 is a perspective, schematic view of a portion of the assembly of FIG. 1 and particularly showing various air gaps between various magnetic circuit components.

The number of Amp-turns required to generate a mechanical force to move the strut 26 between coupling and uncoupling positions is a function of the size of the "Air Gaps" of FIG. 2. Consequently, the air gaps should be made as small as possible to avoid leakage of magnetic flux in order to minimize the number of Amp-turns required to generate the force necessary to move the strut 26 especially at high clutch member RPM (greater than 5 k RPM).

Referring now to FIGS. 6-13, there is illustrated a second embodiment of a planar, coupling and magnetic control assembly, generally indicated at 111. The assembly 111 includes a first coupling member, generally indicated at 110, which may comprise a notch plate or member having a first coupling face 112. The parts or components of the second embodiment which are the same or similar to the parts or components of the first embodiment in either structure or function have the same reference number but one preceded by the number "1".

Figure 10:
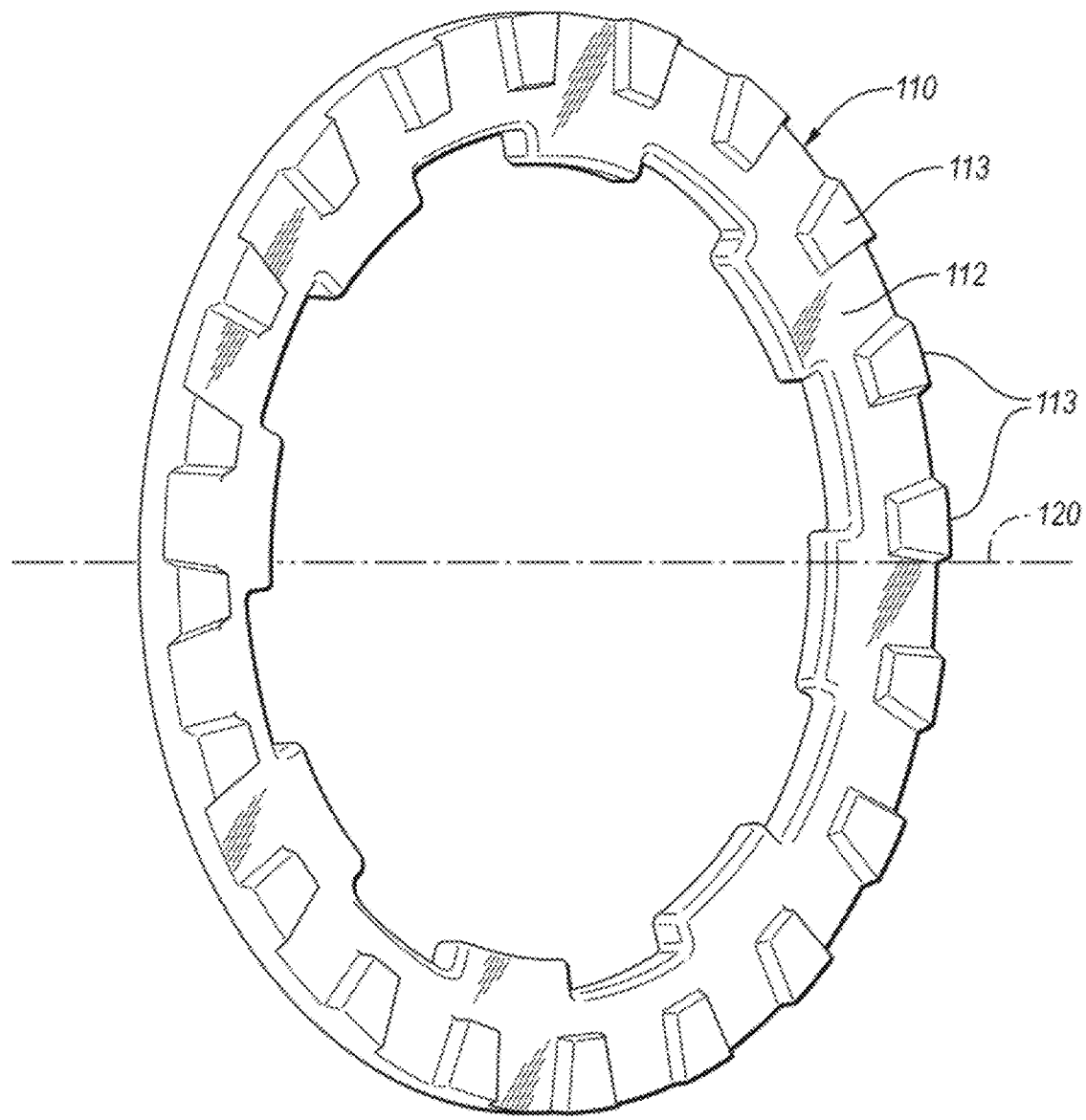
FIG. 10 is a perspective schematic view of the notch plate of FIG. 6.
Figure 12:
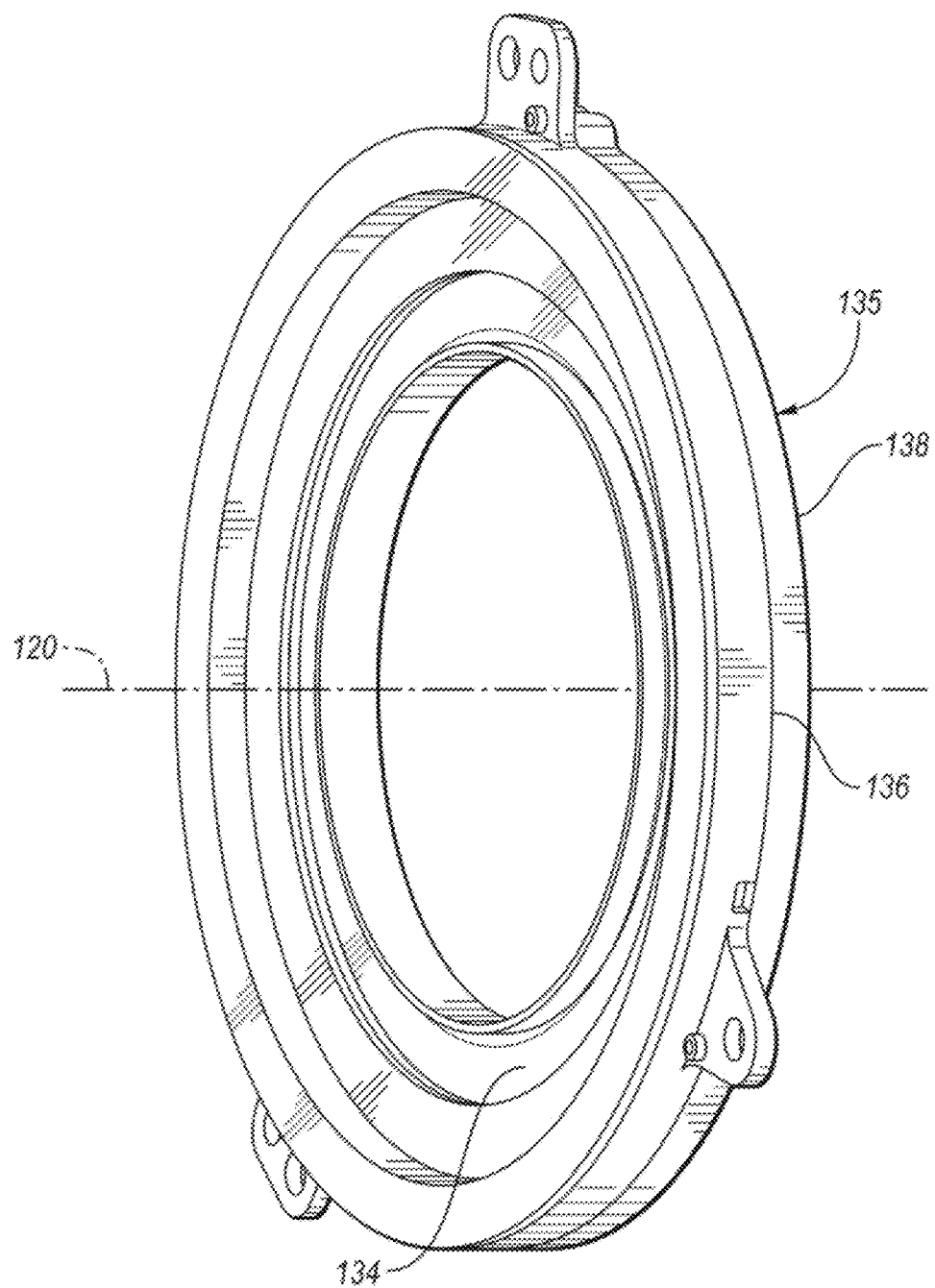
FIG. 12 is a perspective schematic view of the electromagnetic source of FIG. 6.

The assembly 111 may include a non-ferrous, non-magnetic pocket plate or second member, generally indicated at 114, which includes a second coupling face 116 in close-spaced opposition with the first coupling face 112, when the members 110 and 114 are assembled and held together by a locking or snap ring 118. At least one of the members 110 and 114 is mounted for rotation about a common axis 120 (FIGS. 10 and 12).

The second coupling member 114 also includes third face 122 spaced from the second face 116. The third face 122 has first and second spaced passages 125 and 123 which extend through the second coupling member 114 in communication with a pocket 124 formed in the second face 116.

Figure 8:
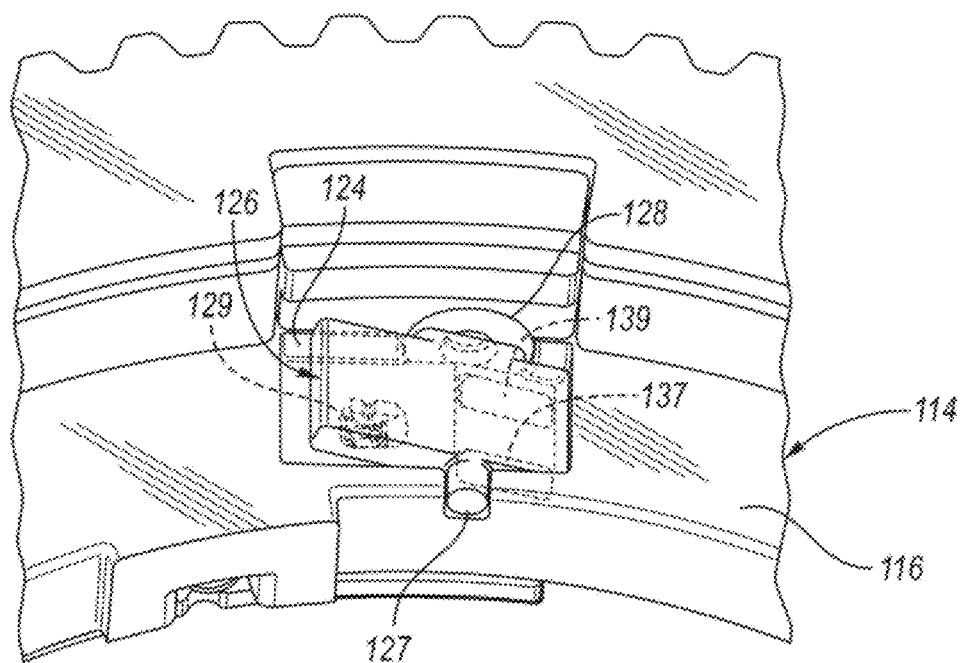
FIG. 8 is a schematic view, partially broken away, of the pocket plate and locking member of FIG. 6 with a biasing spring and pole pieces shown by phantom lines.
Figure 9:
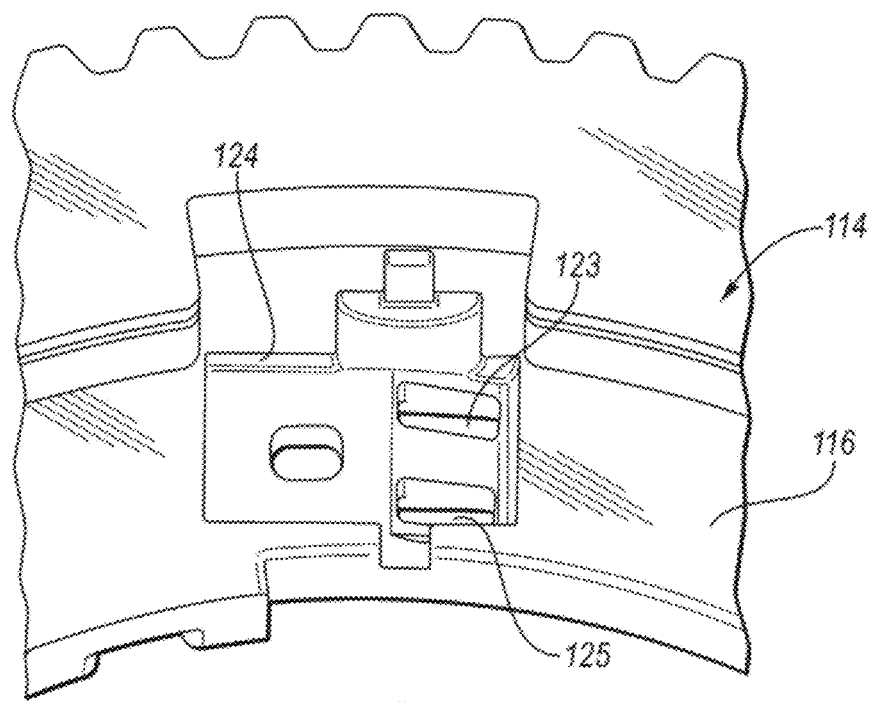
FIG. 9 is a view, similar to the view of FIG. 8, but without the magnetic circuit components or the spring of FIG. 8.
Figure 13:
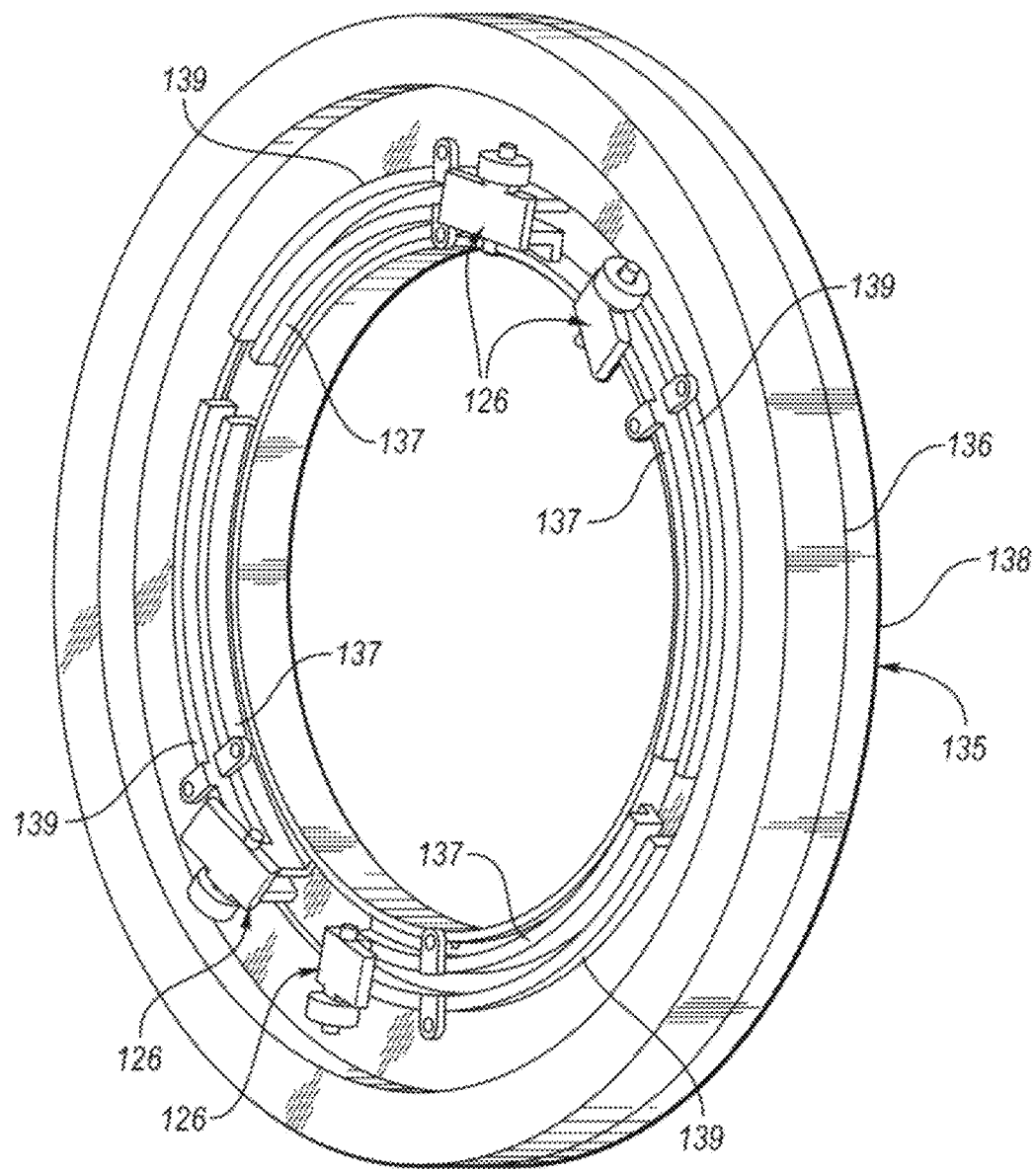
FIG. 13 is a perspective, schematic view of the assembly of FIG. 6 without the notch plate of FIG. 10 and without the pocket plate and return spring.

The pocket 124 preferably is a T-shaped recess or pocket 124 as best shown in FIGS. 8 and 9. The recess 124 defines a load bearing first shoulder. The first coupling face 112 of the notch plate 110 has a plurality of recesses or notches 113. Each notch 113 of the notches defines a load-bearing second shoulder. While only a single pocket 124 is shown in FIGS. 6-9, it is to be understood that a plurality of pockets 124 (and struts 126) are preferred as shown in FIG. 13.

An electromagnetic system for controlling the operating mode of the coupling assembly 111 includes a plurality of magnetic circuit components including a ferro-magnetic element or a locking strut, generally included at 126, extendable between the coupling faces 112 and 116 of the member 110 and the member 112, respectively, when the members 110 and 114 are assembled and held together. Each of the struts 126 may include a pivot pin 127 about which the strut 126 pivots and a bearing 128 to rotatably support the pin 127.

The element 126 may comprise a ferromagnetic locking element or strut movable between first and second positions. The first position (shown in FIGS. 8 and 13) is characterized by abutting engagement of the locking element 126 with a load-bearing shoulder of a notch 113 of the member 110 and the shoulder of the pocket 124 formed in an end wall of the second member 114. The second position (solid lines in FIGS. 6 and 7) is characterized by non-abutting engagement of the locking element 126 with a load-bearing shoulder of at least one of the members 110 and 114. A biasing member or spring 129 (FIG. 8) may be positioned under each of the struts 126 to urge its strut 126 to a return position which corresponds to the uncoupling position of the strut 126.

The electromagnetic system also includes a stationary electromagnetic source, generally indicated at 131, including at least one excitation coil 133 which is at least partially surrounded by an annular ring housing part 135. The housing part 135 includes first and second pieces 136 and 138 which are secured together. The coil 133 is held within a bobbin 134. When the coil 133 is energized (supplied with current), an axial symmetric, generally circular magnetic field 201 loops out of the housing part 135 at a north pole of the housing part 135, through a magnetic insert or pole piece 137, into a first portion of the strut 126, out a second portion of the strut 126, through another insert or pole piece 139 and back into the housing part 135 at a south pole of the housing part 135.

Figure 11:
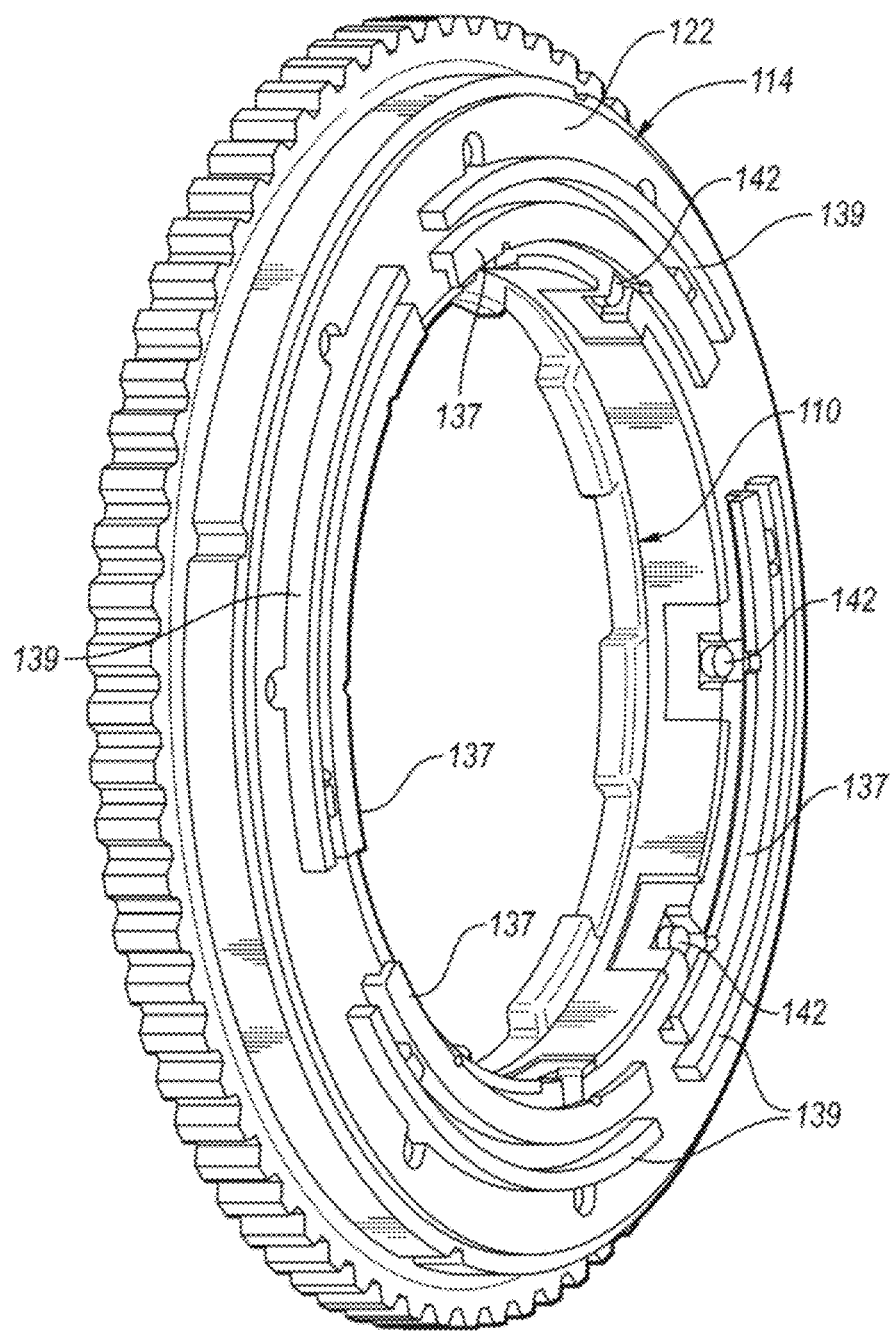
FIG. 11 is perspective schematic view of the assembly of FIG. 6 but without an electromagnetic source.

As shown in FIGS. 11 and 13, the pole pieces 137 and 139 may be segmented and secured to the third face 122 of the pocket plate 114 by screws 142. The pole pieces 137 and 139 are received and retained within the first and second passages 125 and 123, respectively, and are in close-spaced opposition with the north and south poles, respectively, of the housing part 135.

The electromagnetic source 131, the element 126, the inserts 137 and 139, the air gaps between the inserts 137 and 139 and the element 126 and the air gaps between the source 131 and the inserts 137 and 139 make up a closed loop path containing magnetic flux so that the element 126 moves between its coupling and uncoupling positions when the coil 133 is supplied with current. The pole pieces 137 and 139 direct the magnetic field into the strut 126 to attract (or repel) the strut 126 and move the strut 126 into an engaged (or disengaged) position.

The above-noted electromagnetic systems reduce the frictional losses that are generally present in prior art actuation systems that act on locking elements within a rotating clutch member. This is made possible because the actuation system has no moving parts and it has no physical contact with the clutch member. Reducing the frictional losses provides a way to reduce the power consumption requirements of the actuation system.

In summary, the above-described clutch actuation system uses a stationary electromagnetic coil to produce a magnetic field that interacts with locking elements while they are moving with its rotating clutch member. The coil sits inside a core/housing which is axially symmetric with a generally C-shaped cross section. The coil produces an axially symmetric magnetic field that loops out of one side of the C-shaped core and into the other side (like a horseshoe magnet revolved about an axis). The open end of the housing/core faces axially toward a non-magnetic clutch member that houses the locking elements and is free to rotate independently of the coil. The clutch member includes magnetic pole pieces that provide a low reluctance path for the magnetic flux from the coil to reach the locking element. At each controllable locking element, there is an individual magnetic circuit which takes the flux from a portion of the bulk field from the main core and directs it through one pole piece, through the locking element, and through the other pole piece to return back to the main core. The bulk field source is axially symmetric so that the individual magnetic circuits have a constant MMF (i.e. magnetomotive force) source regardless of their orientation relative to the main core; that is what enables the stationary coil to actuate locking elements in a rotating clutch member.

Obviously, the main core or coil housing may have a different shaped cross-section besides a generally C-shape.

Also, the flux path in the individual magnetic circuit components may be such that the flux lines that cross the air gaps between the main core and the pole pieces are oriented in the radial direction to reduce attractive forces between the main core and the clutch member.

Also, a lever may be coupled (not shown) to the strut so that the magnetic force pulls on the lever to control the strut instead of pulling on the strut directly as shown herein. This action could engage or disengage the strut.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electromagnetic system for controlling the operating mode of a non-friction coupling assembly including first and second coupling members supported for a rotation relative to one another about a common axis, the first and second coupling members including coupling first and second faces, respectively, in close-spaced opposition with one another, the second coupling member having a third face spaced from the second face, the second face having a pocket, the first face having a set of locking formations, and the third face having first and second spaced passages in communication with the pocket, the system comprising:

magnetic circuit components including:
a ferromagnetic or magnetic element received within the pocket in a first position and projecting outwardly from the pocket in a second position, the element controlling the operating mode of the coupling assembly;
a stationary electromagnetic source including at least one excitation coil which generates a magnetic field between first and second poles of the electromagnetic source when the at least one coil is supplied with current; and
ferromagnetic or magnetic first and second inserts received and retained within the first and second spaced passages, respectively, of the second coupling member, the first and second inserts being in close-spaced opposition across first and second air gaps respectively, with the first and second poles, respectively, of the electromagnetic source, the first and second inserts being in close-spaced opposition across third and fourth air gaps, respectively, with first and second spaced portions, respectively, of the element, wherein the electromagnetic source, the inserts, the air gaps, and the element make up a closed loop path containing magnetic flux so that the element moves between the first and second positions when the at least one coil is supplied with current.

2. The system as claimed in claim 1, wherein the first and third faces are oriented to face axially in a first direction along the rotational axis and the second face is oriented to face axially in a second direction opposite the first direction along the rotational axis.

3. The system as claimed in claim 1, wherein the electromagnetic source further includes an annular ring housing having an annular recess in which the at least one coil is located, the housing being axially symmetric about the rotational axis and wherein the magnetic field is a generally circular magnetic field.

4. The system as claimed in claim 3, wherein the housing has a generally C-shaped cross-section.

5. The system as claimed in claim 1, wherein the element is a locking element which prevents relative rotation of the first and second coupling members with respect to each other in at least one direction about the axis.

6. The system as claimed in claim 5, wherein the locking element is an injection molded strut.

7. The system as claimed in claim 1, further comprising a return biasing member to urge the element to a return position which corresponds to either the first position or the second position of the element.

8. The system as claimed in claim 1, wherein the first, second and third faces are generally annular and extend generally radially with respect to the axis.

9. The system as claimed in claim 1, wherein the coupling assembly is a clutch assembly and the first and second faces are clutch faces.

10. The system as claimed in claim 1, wherein the at least one coil has a circumference and wherein the inserts comprise magnetic pole pieces which cover substantially the entire circumference of the at least one coil.

11. The system as claimed in claim 1, wherein the second coupling member is made of non-ferrous/non-magnetic material.

12. The system as claimed in claim 1, wherein a plurality of coils generate the magnetic field.

13. A coupling and magnetic control assembly comprising:

first and second coupling members supported for a rotation relative to one another about a common axis, the first and second coupling members including coupling first and second faces, respectively, in close-spaced opposition with one another, the second coupling member having a third face spaced from the second face, the second face having a pocket, the first face having a set of locking formations, and the third face having first and second spaced passages in communication with the pocket; and magnetic circuit components including:
a ferromagnetic or magnetic element received within the pocket in a first position and projecting outwardly from the pocket in a second position, the element controlling the operating mode of the coupling assembly;
a stationary electromagnetic source including at least one excitation coil which generates a magnetic field between first and second poles of the electromagnetic source when the at least one coil is supplied with current; and
ferromagnetic or magnetic first and second inserts received and retained within the first and second spaced passages, respectively, of the second coupling member, the first and second inserts being in close-spaced opposition across first and second air gaps, respectively, with the first and second poles, respectively, of the electromagnetic source, the first and second inserts being in close-spaced opposition across third and fourth air gaps, respectively, with first and second spaced portions, respectively, of the element, wherein the electromagnetic source, the inserts, the air gaps, and the element make up a closed loop path containing magnetic flux so that the element moves between the first and second positions when the at least one coil is supplied with current.

14. The assembly as claimed in claim 13, wherein the first and third faces are oriented to face axially in a first direction along the rotational axis and the second face is oriented to face axially in a second direction opposite the first direction along the rotational axis.

15. The assembly as claimed in claim 13, wherein the electromagnetic source further includes an annular ring housing having an annular recess in which the coil is located, the housing being axially symmetric about the rotational axis and wherein the magnetic field is a generally circular magnetic field.

16. The assembly as claimed in claim 15, wherein the housing has a generally C-shaped cross-section.

17. The assembly as claimed in claim 13, wherein the element is a locking element which prevents relative rotation of the first and second coupling members with respect to each other in at least one direction about the axis.

18. The assembly as claimed in claim 17, wherein the locking element is an injection molded strut.

19. The assembly as claimed in claim 17, further comprising a return biasing member to urge the element to a return position which corresponds to either the first position or the second position of the element.

20. The assembly as claimed in claim 13, wherein the first, second and third faces are generally annular and extend generally radially with respect to the rotational axis.

21. The assembly as claimed in claim 13, wherein the coupling assembly is a clutch assembly and the first and second faces are clutch faces.

22. The assembly as claimed in claim 13, wherein the at least one coil has a circumference and wherein the inserts comprise magnetic pole pieces which cover substantially the entire circumference of the at least one coil.

23. The assembly as claimed claim 13, wherein the second coupling member is made of non-ferrous/non-magnetic material.

24. The assembly as claimed in claim 13, wherein a plurality of coils generate the magnetic field.

* * * * *